United States Patent
Drane

(10) Patent No.: US 8,378,232 B2
(45) Date of Patent: Feb. 19, 2013

(54) CONVERTIBLE PVC/CAST IRON ELECTRICAL FLOOR BOX

(75) Inventor: Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 491 days.

(21) Appl. No.: 12/692,977

(22) Filed: Jan. 25, 2010

(65) Prior Publication Data

US 2010/0193237 A1  Aug. 5, 2010

Related U.S. Application Data

(60) Provisional application No. 61/206,882, filed on Feb. 5, 2009.

(51) Int. Cl.
  *H02G 3/18* (2006.01)
  *H02G 3/08* (2006.01)
(52) U.S. Cl. .......... 174/482; 174/50; 174/490; 174/559; 220/3.2; 220/3.3; 220/4.02
(58) Field of Classification Search .................. 174/482, 174/50, 53, 57, 58, 487, 490, 559; 220/3.2–3.9, 220/4.02; 248/906
  See application file for complete search history.

(56) References Cited

U.S. PATENT DOCUMENTS

| | | | |
|---|---|---|---|
| 3,029,964 A | 4/1962 | Hudson et al. | |
| 4,304,079 A | 12/1981 | Thorsten | |
| 4,927,039 A * | 5/1990 | McNab | 174/57 |
| 5,117,996 A * | 6/1992 | McShane | 174/57 |
| 5,171,939 A * | 12/1992 | Shotey | 174/67 |
| 5,285,009 A | 2/1994 | Bowman et al. | |
| 5,362,922 A | 11/1994 | Whitehead | |
| 5,420,376 A | 5/1995 | Rajecki et al. | |
| 5,466,886 A | 11/1995 | Lengyel et al. | |
| 5,627,340 A | 5/1997 | Smith et al. | |
| 5,783,774 A | 7/1998 | Bowman et al. | |
| 6,274,809 B1 | 8/2001 | Pudims et al. | |
| 6,316,725 B1 | 11/2001 | Cole et al. | |
| 6,355,880 B1 | 3/2002 | Bateson et al. | |
| 6,395,978 B1 | 5/2002 | Whitehead et al. | |
| 6,521,833 B1 | 2/2003 | DeFreitas | |
| 6,940,016 B1 * | 9/2005 | Cornett et al. | 174/58 |
| 7,145,075 B2 | 12/2006 | Hull et al. | |
| 7,504,580 B2 * | 3/2009 | Lammens et al. | 174/50 |
| 7,635,110 B2 * | 12/2009 | Galasso et al. | 174/483 |
| 7,825,335 B2 * | 11/2010 | Carbone et al. | 174/50 |
| 8,063,317 B2 * | 11/2011 | Bowman | 174/483 |

* cited by examiner

*Primary Examiner* — Angel R Estrada
(74) *Attorney, Agent, or Firm* — Hoffmann & Baron, LLP

(57) ABSTRACT

A convertible electrical floor box assembly for installation in a poured concrete floor that includes a non-metallic floor box and a metallic outer box. The non-metallic floor box includes a base plate, a perimetrical side wall with one or more openings for accessing the interior, an open top, a mating structure and an internal support structure for receiving a voltage divider. The metallic outer box includes a base plate, a perimetrical side wall with one or more apertures for accessing the interior, an open top and a mating structure. The non-metallic floor box is adapted for installation in a concrete floor or it can be used together with the metallic outer box as an assembly that is adapted for installation in a concrete floor by inserting the non-metallic floor box in the metallic outer box so that the openings and apertures are aligned.

21 Claims, 8 Drawing Sheets

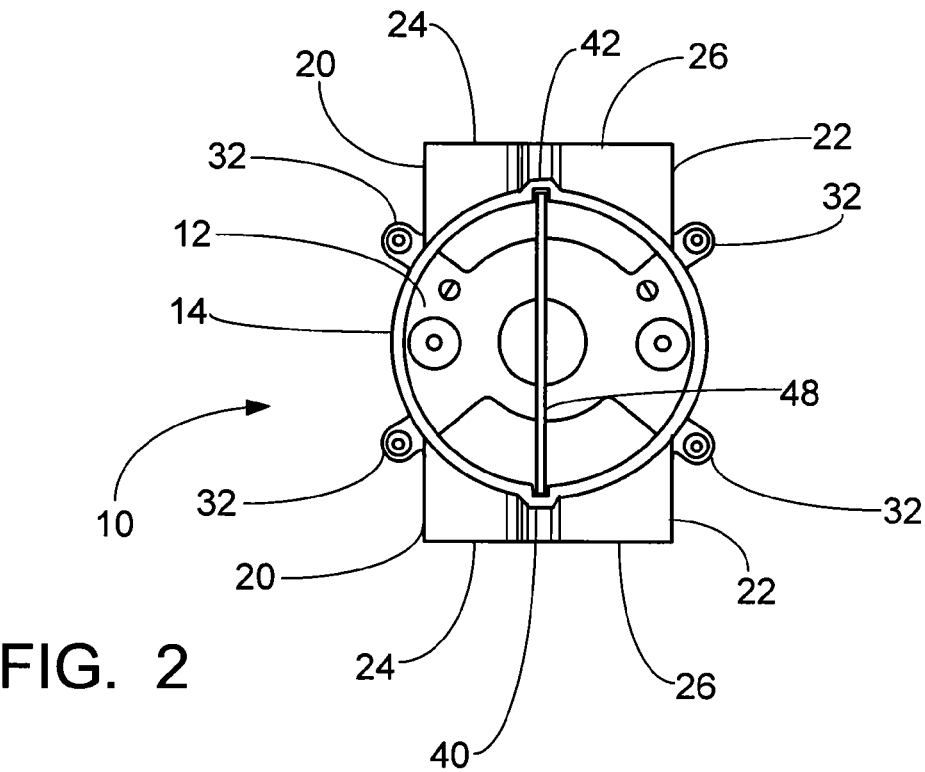
FIG. 2
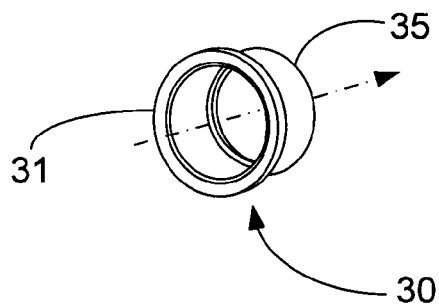
FIG. 3A
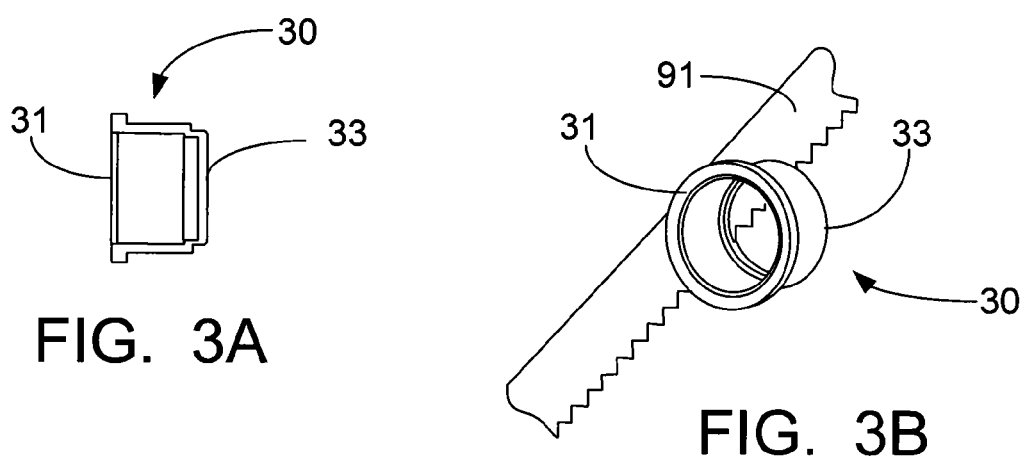
FIG. 3B
FIG. 3C

US 8,378,232 B2

CONVERTIBLE PVC/CAST IRON ELECTRICAL FLOOR BOX

This application claims priority from provisional application Ser. No. 61/206,882, filed on Feb. 5, 2009, which is incorporated herein in its entirety.

FIELD OF THE INVENTION

The present invention relates to electrical boxes installed in concrete floors. In particular, the present invention relates to dual voltage electrical boxes constructed of a thermoplastic polymer, preferably PVC, which can be installed directly in concrete floors or in a metal or cast iron box installed in concrete floors.

BACKGROUND OF INVENTION

The use of an electrical junction or outlet box to accommodate electrical cable terminations is well known in the art. These boxes typically house electrical components, such as electrical receptacles, jacks, plugs and other devices. The junction box permits the electrical cables to either pass through or connect to the electrical components housed inside the box. In certain applications, these junction boxes are used in floor installations, and are referred to as floor boxes. Electrical cable distribution takes place beneath the surface of the floor and the junction boxes are designed to be supported within a poured concrete floor. One of the problems in positioning a floor box is that the installer must assure that the top of the floor box is both flush and level with the top of the poured floor in which it is set.

In the prior art, it is known to provide floor boxes which are set in poured concrete floors and then sawed off to accommodate the depth of the poured floor. Examples of these cuttable floor boxes are shown in U.S. Pat. No. 3,343,704 to Terry and U.S. Pat. No. 5,466,886 to Lengyel et al. However, these cuttable floor boxes have certain disadvantages. The cuttable floor boxes typically have an open end and thus require a separate cover to protect the interior of the box from debris and extraneous concrete during pouring of the concrete floor. Furthermore, many of these cuttable floor boxes require complicated assemblies to assure that the terminations housed at the upper end of the box are level with the concrete floor. Additionally, many electrical standards, such as the National Electrical Code (NEC), require floor boxes that accommodate multiple services (e.g., power and communication services) be designed to maintain physical separation between the various services within the box.

In many floor applications, the junction box is positioned on a deck and concrete is poured over the deck to form the floor. The deck typically includes ducts, conduits or corrugations for the passage of the cables under the floor. In these applications, the junction box is positioned on the deck and connected to the duct, conduit or corrugations prior to pouring the concrete. Once the box is properly positioned, the concrete is poured onto the deck and around the junction box to form a concrete floor. In order to accommodate variations in the poured concrete floor thickness, the junction box is typically constructed so that the upper end of the box extends above the level of the poured concrete floor. Once the concrete floor has set, the installer cuts away the portion of the box extending above the surface of the floor so that the top of the box is flush with the surface of the poured concrete floor.

Floor boxes embedded in concrete floors are typically formed of either polyvinyl chloride (PVC) or cast iron. Regardless of the fabrication material, in-floor electrical boxes must often include various internal members. For example, depending on the particular application, an electrical floor box can include upper assemblies, concrete caps, and, in the case of a dual voltage box, voltage dividers. PVC has certain advantages over cast iron boxes, such as ease of manufacture by conventional molding techniques, light weight, nonconductive and low cost. Cast iron electrical boxes have the advantages of greater strength, non-deformability and shaping ability, albeit by secondary manufacturing operations at additional cost.

For many applications, electrical boxes made of either PVC or cast iron are suitable for in-floor installation. PVC boxes are generally preferred because they are less expensive. However, in some cases, local and/or state building codes require electrical boxes installed in concrete floors to be made of a metal, such as cast iron. Thus, it is common for contractors to maintain supplies of both PVC electrical floor boxes and cast iron electrical floor boxes. This adds to their costs and requires additional storage space.

It is, therefore, desirable to provide a PVC floor box for installation in a poured concrete floor which can also be used as part of a cast iron electrical box assembly. It is also desirable to provide a PVC electrical floor box that can be easily and securely installed in a cast iron outer box. Moreover, there is a need for an electrical box with an extension that can be modified for use with concrete floors of different depths.

SUMMARY OF THE INVENTION

In accordance with the present invention, a convertible electrical floor box assembly and a method for installing the convertible electrical floor box assembly in a poured concrete floor are provided. One embodiment of the convertible electrical floor box assembly includes a non-metallic floor box and a metallic outer box.

The non-metallic floor box includes a base plate, a perimetrical side wall, an open top and a mating structure. The perimetrical side wall has an interior side and an exterior side and extends between the base plate and a top edge to define the interior of the non-metallic floor box and the open top. The perimetrical side wall also has one or more openings for accessing the interior. The perimetrical side wall of the non-metallic floor box is preferably curved and most preferably substantially round or oval in shape. The mating structure is located on the exterior side of the perimetrical side wall and preferably includes a pair of slotted members formed in opposite sides of the floor box.

The non-metallic floor box can also include an internal support structure in the interior that extends upwardly from the base. The internal support structure includes a pair of opposing slots that extend from the top edge to the base plate and have an open end at the top edge of the perimetrical side wall. The pair of opposing slots is adapted to receive a voltage divider to divide the interior of the box into two electrically isolated spaces. The open top of the non-metallic floor box is adapted to receive a removable cover that prevents concrete and other materials from entering the interior of the box.

The metallic outer box includes a base plate, a perimetrical side wall, an open top and a mating structure. The perimetrical side wall has an interior side and extends between the base plate and a top edge to define the interior and the open top of the box. The perimetrical side wall has one or more apertures for accessing the interior and a mating structure extending inwardly from the interior side. The mating structure preferably includes a pair of members located on opposite sides of the metallic outer box and each member engages a pair of slotted members formed on opposite sides of the non-metallic floor box. Those skilled in the art will understand that the invention is not limited to members extending from the interior wall of the metallic outer box and slots formed in the non-metallic floor box, but can also include mating structures wherein the slots are in the metallic outer box and the members extend from the exterior side wall of the non-metallic floor box.

The non-metallic floor box is adapted for installation in a concrete floor or it can be used together with the metallic outer box as an assembly that is adapted for installation in a concrete floor. When the non-metallic floor box and the metallic outer box are used as an assembly, the non-metallic floor box is received in the interior of the metallic outer box and the mating structure of the non-metallic floor box engages the mating structure of the metallic outer box. Preferably, the perimetrical side wall of the non-metallic floor box is substantially round or oval in shape and the perimetrical side wall of the metallic outer box is rectangular, hexagonal or octagonal in shape. A removable plate extending between the perimetrical side wall of the non-metallic floor box and the top edge of the metallic outer box can be secured to the metallic outer box by one or more fasteners or screws. The removable plate preferably has a centrally located opening defined by an inner perimetrical edge that receives the non-metallic floor box and an outer perimetrical edge. The inner perimetrical edge surrounds the perimetrical side wall of the non-metallic floor box and the outer perimetrical edge extends over the top edge of the perimetrical side wall of the metallic outer box.

The one or more openings in the non-metallic floor box and the one or more apertures in the metallic outer box are correspondingly located and aligned to provide access to the interior of the non-metallic floor box from the exterior of the metallic outer box. Preferably, the apertures in the perimetrical side wall of the metallic outer box are located adjacent to the base plate and can be selectively sealed with removable plugs. The non-metallic floor box can also have a plurality of tabs extending from the exterior side of the perimetrical side wall at the base and each tab can have an aperture. The metallic outer box can have a plurality of threaded openings in the base plate corresponding to the apertures in the plurality of tabs. The apertures and threaded openings are adapted to receive mounting screws for securing the non-metallic floor box in the metallic outer box.

In another embodiment, the convertible electrical floor box assembly includes a non-metallic floor box and a metallic outer box. The non-metallic floor box includes a base plate, a perimetrical side wall, an open top and a pair of opposing mating structures. The perimetrical side wall has an interior side and an exterior side and extends between the base plate and a top edge to define the open top and the interior of the box. The perimetrical side wall can have one or more openings for accessing the interior and a pair of opposing mating structures on the exterior side of the perimetrical side wall.

The metallic outer box includes a base plate, a perimetrical side wall, an open top, one or more apertures in the perimetrical side wall for accessing the interior and a pair of opposing mating structures. The perimetrical side wall has an interior side and extends between the base plate and a top edge to define the open top and the interior of the box. The perimetrical side wall can have one or more apertures for accessing the interior. Each of the pair of opposing mating structures extends inwardly from the interior side of the perimetrical side wall.

The metallic outer box is adapted to receive the non-metallic floor box and the mating structures of the non-metallic floor box engage the mating structures of the metallic outer box. The one or more openings in the non-metallic floor box and the one or more apertures in the metallic outer box are correspondingly located and aligned to provide access to the interior of the non-metallic floor box. The non-metallic floor box can also include a pair of opposing slots (also referred to herein as recessed tracks) formed in the interior side of the perimetrical side wall and adapted to receive a voltage divider. The pair of opposing slots or recessed tracks is correspondingly located opposite the pair of opposing mating structures on the exterior side of the perimetrical side wall of the non-metallic floor box. Each of the opposing slots and each of the opposing mating structures are disposed between a pair of openings in the perimetrical side wall.

The present invention also includes a method of installing a convertible electrical floor box assembly in a concrete floor. The method includes: providing a non-metallic floor box and a metallic outer box as described above; positioning the metallic outer box on a substrate for a poured concrete floor; inserting the non-metallic floor box in the metallic outer box; connecting conduit to at least one of the apertures in the metallic outer box; installing a cover on the top edge of the non-metallic floor box; and pouring a concrete floor around the convertible electrical floor box assembly. When the non-metallic floor box is inserted in the metallic outer box, the mating structure of the non-metallic floor box engages the mating structure of the metallic outer box and the openings in the metallic outer box and the non-metallic floor box are correspondingly located and aligned.

BRIEF DESCRIPTION OF THE FIGURES

The preferred embodiments of the convertible electrical floor box assembly of the present invention, as well as other objects, features and advantages of this invention, will be apparent from the accompanying drawings wherein:

FIG. 2 is a top view of the non-metallic floor box of FIG. 1.

FIGS. 3A-C show three views of a non-metallic plug being formed into a bushing by removing the closed end.

DETAILED DESCRIPTION OF THE INVENTION

Figure 1:
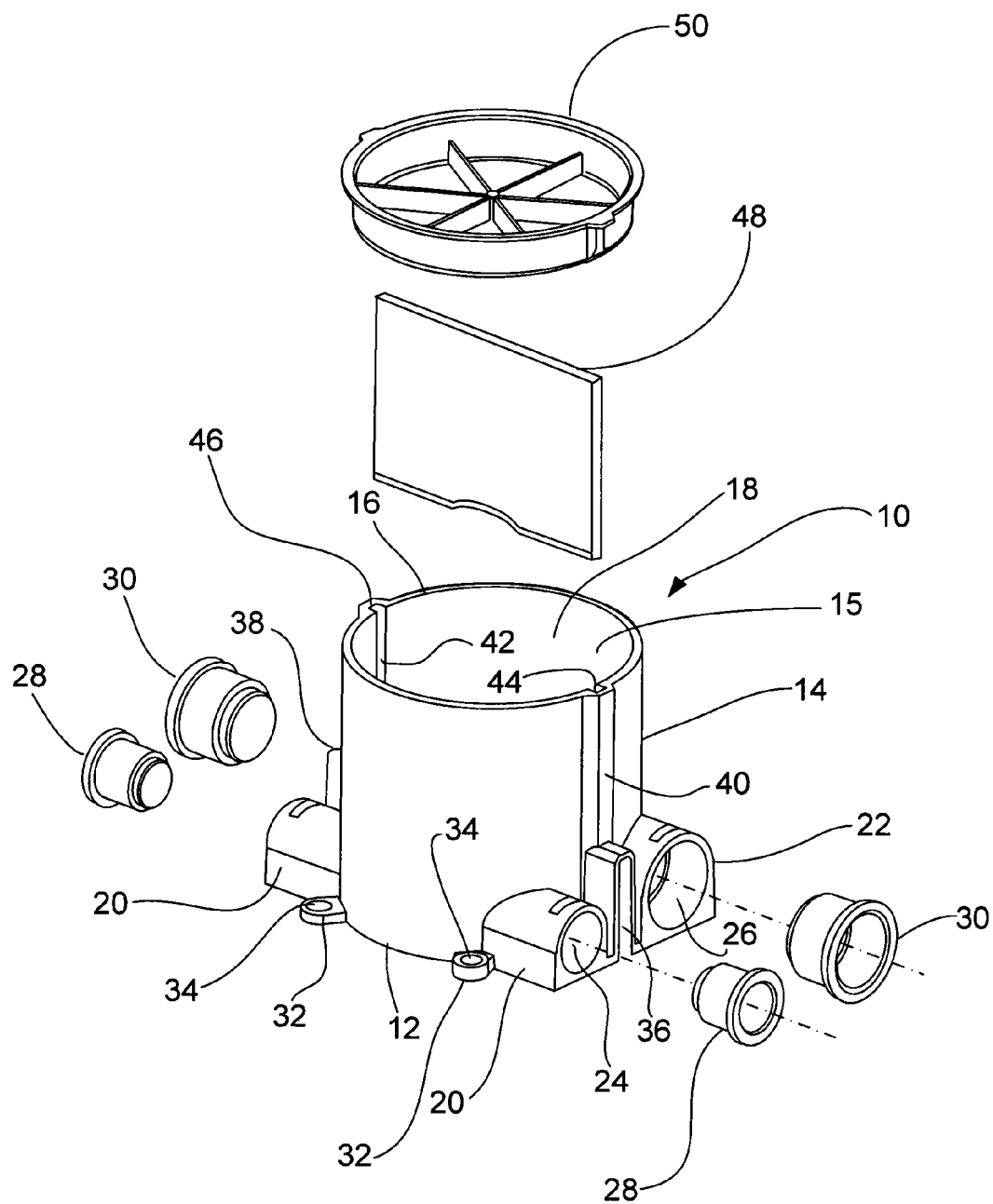
FIG. 1 is an exploded, perspective view of an embodiment of the non-metallic floor box of the convertible electrical floor box assembly of the present invention.

The present invention is a convertible electrical floor box assembly for installation in concrete floors. The assembly includes a non-metallic floor box that can be used alone or together with a metallic outer box. As used herein, the term "metallic outer box" refers to floor boxes made of metal or metal alloys as well as cast iron boxes. In a preferred embodiment, the non-metallic box is installed in the metallic box to prevent the non-metallic box from being deformed when the concrete is poured around it. The non-metallic and metallic boxes have corresponding openings that are aligned so that electrical conduits can be connected and provide access to the interior of the non-metallic box.

Separate openings in the electrical floor box assembly are provided for power wires and cables and for low voltage data communications and signal wiring. On the interior wall of the non-metallic box, slots, guide grooves or other mating structure for receiving a voltage divider are provided between the power and data communications openings. Installing the voltage divider forms two separate compartments inside the non-metallic box and isolates the power wiring from the data communications wiring.

The convertible electrical floor box assembly includes a non-metallic floor box, preferably fabricated from a thermoplastic polymer such as PVC and a metallic or cast iron outer box. The non-metallic floor box has a base plate and a perimetrical side wall that extends from the base plate to a top edge and defines the interior and the open top of the non-metallic floor box. The non-metallic floor box also has one or more openings in the side wall for accessing the interior and one or more grooves or other mating structure in or on the exterior side of the side wall that extends upwardly from the base. The function of the mating structure is described below.

The metallic outer box includes a base plate, a perimetrical side wall extending between the base plate and a top edge that defines the interior and the open top of the metallic outer box. The metallic outer box also has one or more apertures (preferably threaded) in the perimetrical side wall for accessing the interior and one or more members or other mating structure on the interior side of the perimetrical side wall, which extend upwardly from the base.

The non-metallic floor box can be independently installed in a concrete floor or, alternatively, the non-metallic floor box and the metallic outer box can be used together as an assembly. When the convertible floor box assembly is installed in a concrete floor, the non-metallic floor box is received in the interior of the metallic outer box and the one or more slots or grooves receive the one or more members. As one skilled in the art would understand, different types of mating structures can be used to attach the two boxes and it is within the scope of the present invention for the slots/grooves to be formed on the interior of the perimetrical side wall of the outer metallic box and the members to be formed on the exterior perimetrical side wall of the non-metallic floor box. The openings/apertures in the side walls of the two boxes correspond and are aligned so that cables and/or wires can easily pass from the outside of the metallic box into the interior of the non-metallic box.

The perimetrical side walls of the non-metallic and metallic outer boxes can have a variety of different shapes and sizes. The perimetrical side walls can be round, oval, square, rectangular, pentagonal, hexagonal or octagonal. Preferably, the non-metallic floor box has a round or cylindrically-shaped side wall and the perimetrical side wall of the metallic outer box is substantially square. However, the only limitation regarding the shapes of the two boxes is that the cable openings in the perimetrical side walls of the non-metallic and metallic outer boxes must correspond and align when the non-metallic floor box is inserted into the metallic outer box.

The convertible electrical floor box assembly as described above is installed in a concrete floor by positioning the metallic outer box on a deck or a substrate for a poured concrete floor. The non-metallic floor box is inserted in the metallic outer box so that the mating structure of the metallic outer box engage the mating structure of the non-metallic floor box and the openings in the metallic outer box and the non-metallic floor box are aligned. One or more conduits can then be connected to one or more of the apertures in the metallic outer box to provide access to the interior of the non-metallic box. A cover with can be installed on the top edge of the non-metallic floor box to prevent concrete and other materials from getting onto the interior. The concrete floor is then be poured around the convertible electrical floor box assembly.

Referring now to the drawings, FIG. 1 shows an exploded view of a non-metallic floor box 10 having a base 12 and a substantially cylindrical perimetrical side wall 14 extending from the base 12 to a top edge 16 that defines an opening 18. Adjacent to the base 12, a pair of hubs 20, 22 extends from opposing sides of the perimetrical side wall 14. Each of the hubs 20, 22 has an axial bore 24, 26 that provides access to the interior 15 of the box 10. These axial bores 24, 26 can be sealed off to isolate the interior 15 of the box 10 by inserting plugs 28, 30 in the axial bores 24, 26. The pair of hubs 20 on one side of the box 10 is used for low voltage wires and/or cables (not shown) that transmit data or signals and the other pair of hubs 22 is used for electrical wires and/or cables for power (not shown). Four tabs 32 extend from the exterior of the perimetrical side wall 14 at the base 12 of the box 10. These tabs 32 have apertures 34 for receiving a screw (not shown) or other type of fastening device for securing the box 10 to a surface.

Figure 6:
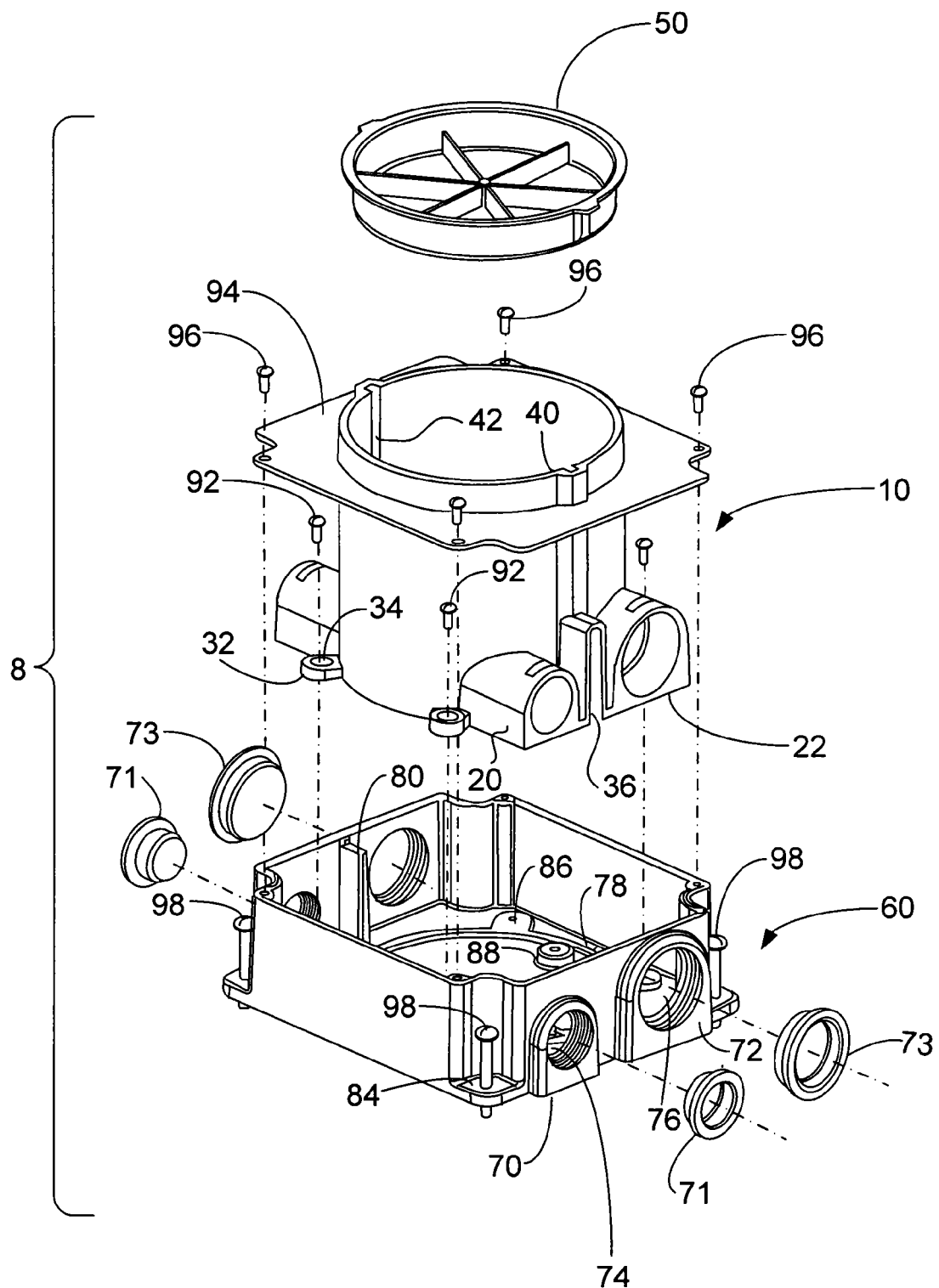
FIG. 6 is an exploded, perspective view of an embodiment of the convertible electrical floor box assembly of the present invention showing the non-metallic floor box and the metallic floor box.

FIG. 1 also shows a mating structure such as a guide groove 36, 38 between each pair of hubs 20, 22, which is used to align the non-metallic floor box 10 when it is inserted into the metallic outer box 60 (FIG. 6.) The box 10 can also have a pair of opposing slots 40, 42 on the interior 15 side of the perimetrical side wall 14 that extends substantially perpendicular to the base 12 from the base 12 to the top edge 16 of the box 10. An opening 44, 46 at the top of each slot 40, 42 is adapted to receive a voltage divider 48 that slides into the opposing slots 40, 42 to divide the interior of the box 10 into two separate compartments for high and low voltage wiring and devices. Other methods for securing the divider 48 in box 10, such as members, or clips extending from the perimetrical side wall 14 into the interior 15 can also be used. After the box 10 is installed, a removable cap or cover 50 is placed over the top edge 16 to cover the opening 18 in the box 10. The cap/cover 50 prevents concrete, dust, dirt and other materials from entering the box 10 when the concrete floor 99 (see FIG. 9) is poured.

FIG. 2 is a top view of the non-metallic floor box of FIG. 1 and shows how the voltage divider 48 forms two separate compartments in the box 10. Power wiring and data wiring entering and/or leaving the box 10 through the hubs 20, 22 are separated at all times so that the power wiring does not affect the data signals.

FIGS. 3A-C show a plug 30 that is used to seal the opening 26 in one of the hubs 22 (FIG. 1). FIG. 3A shows the cylindrically-shaped plug 30 with an open first end 31 and a closed second end 33. FIG. 3B shows a saw 91 (other cutting tools can also be used) being used to cut off the closed second end 33 of the plug 30 to form a bushing with an open second end 35.

Figure 4:
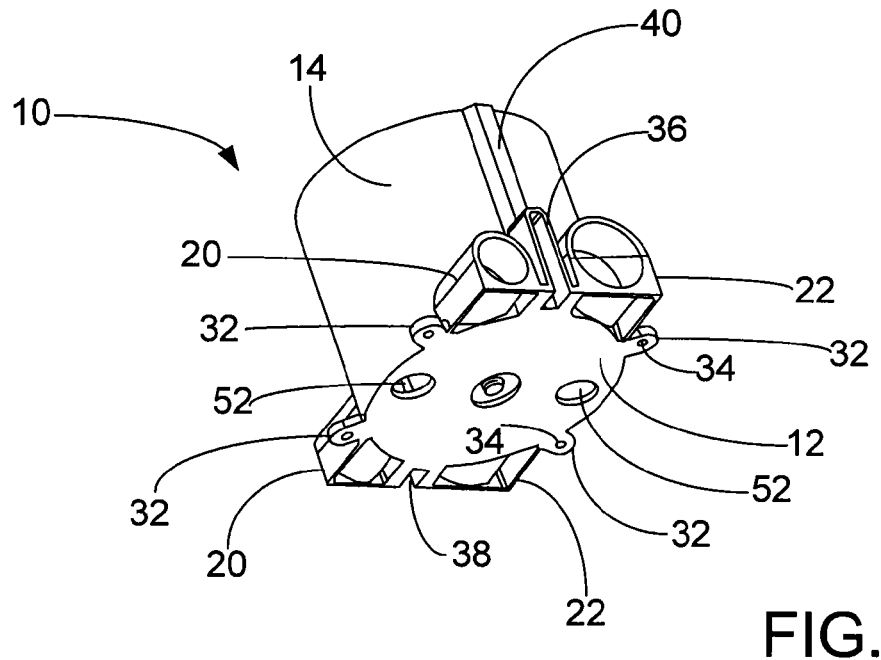
FIG. 4 is perspective, bottom view of the non-metallic floor box of FIG. 1.

FIG. 4 is a bottom view of the non-metallic floor box 10 and shows a pair of removable knockouts 52 that are located on opposing sides of the base 12. As described in more detail below, the knockouts 52 are removed when the non-metallic floor box 10 is installed in a metallic outer box 60 so that electrical devices in the non-metallic floor box 10 can be grounded to the metallic outer box 60 (FIG. 5).

Figure 5:
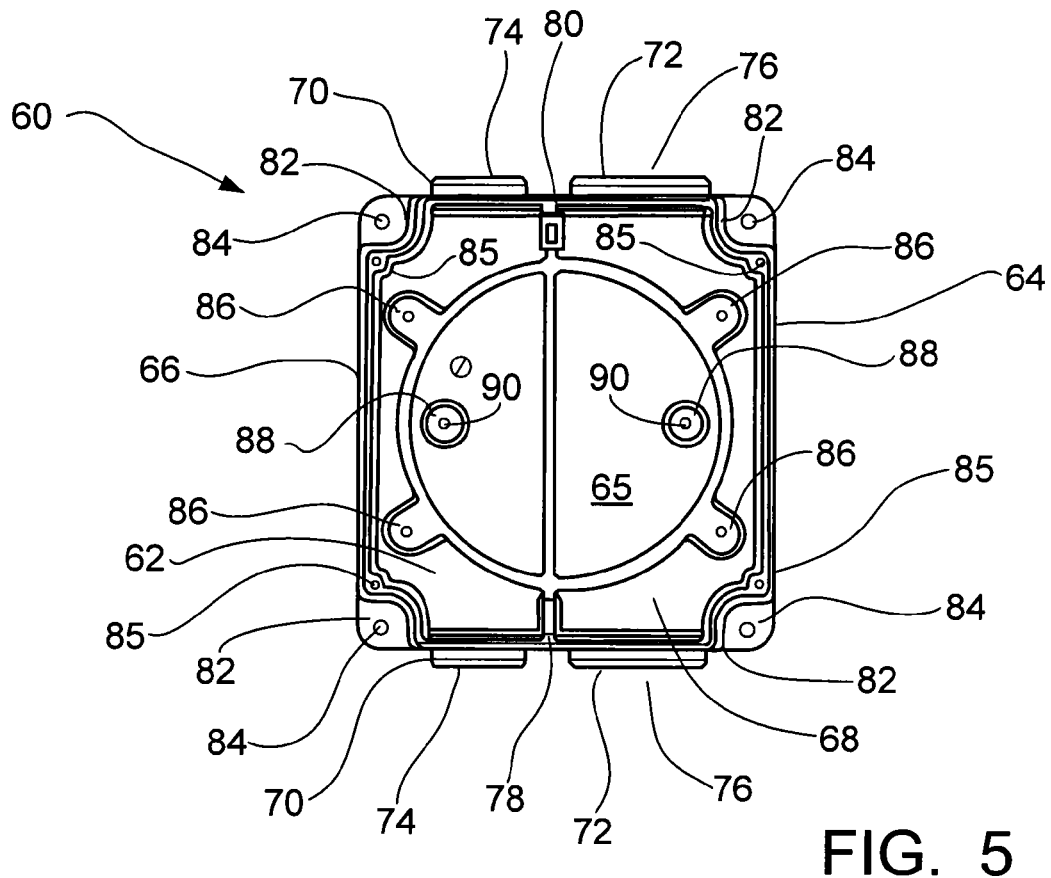
FIG. 5 is a top view of an embodiment of a metallic floor box of the convertible electrical floor box assembly of the present invention.

FIG. 5 is a top view of a metallic outer box 60 having a base 62 and four side walls 64 extending therefrom to a top edge 66 that defines an opening 68 in the box 60. A pair of conduit hubs 70, 72 with threaded bores 74, 76 extend through the opposing side walls 64. Mating structure such as a pair of members 78, 80 are located between each pair of bores 74, 76 on the interior side of the walls 64, and each member 78, 80 extends from the base 62 to the top edge 66. The side walls 64 have recessed portions 82 at the corners of the box 60 so that the base 62 extends beyond the exterior of the side walls 64. An aperture 84 is formed in the base 62 at each of the four corners. In addition, a threaded aperture 85 is located on the top edge 66 adjacent to each of the corners. In the interior 65 of the box 60, the base 12 has four tapped apertures 86 which are located so that they correspond with the apertures 34 in the tabs 32 extending from the side wall 14 of the non-metallic box 10 (FIG. 6). The base 62 also has a pair of protrusions or bumps 88 that extend upwardly into the interior of the box 60. The bumps 88 have threaded apertures 90 that can receive grounding screws (not shown).

FIG. 6 shows an exploded view of the convertible electrical floor box assembly 8 including the non-metallic floor box 10 and the metallic outer box 60. The mating structure 78, 80 on the interior side walls 64 of the metallic outer box 60 receive the mating structure 36, 38 of the non-metallic box 10 to ensure that the boxes 10, 60 are properly fitted together. The hubs 20, 22 of the non-metallic box 10 align with the conduit hubs 70, 72 of the metallic outer box 60 and the knockouts 52 (see FIG. 4) in the base 12 of the non-metallic box 10 align with the bumps 88 in the base 62 of the metallic outer box 60. After the non-metallic box 10 is installed in the metallic outer box 60, screws 92 can be inserted through the apertures 34 in the tabs 32 of the non-metallic box 10 and threaded into the threaded apertures 86 in the base 62 of the metallic outer box 60 to secure the non-metallic box 10.

FIG. 6 also shows a removable plate 94 fitted over the non-metallic box 10 and attached to the metallic outer box 60. The plate 94 has an aperture for receiving the side wall 14 of the non-metallic box 10 and the plate 94 is secured in place with screws 96 that are threaded into the apertures 85 in the top edge 66 of the metallic outer box 60. The plate 94 prevents concrete and other undesirable materials from entering the space between the non-metallic box 10 and the metallic outer box 60. The cover 50 prevents concrete and other materials from entering into the non-metallic box 10. The threaded bores 74, 76 of the conduit hubs 70, 72 can be fitted with either metallic or plastic removable plugs 71, 73 to seal the metallic outer box 60 when the bores 74, 76 are not being used. The apertures 84 at the corners of the metallic outer box 60 receive leveling screws 98, which are used to level the metallic outer box 60 before the concrete floor is poured.

Figure 7:
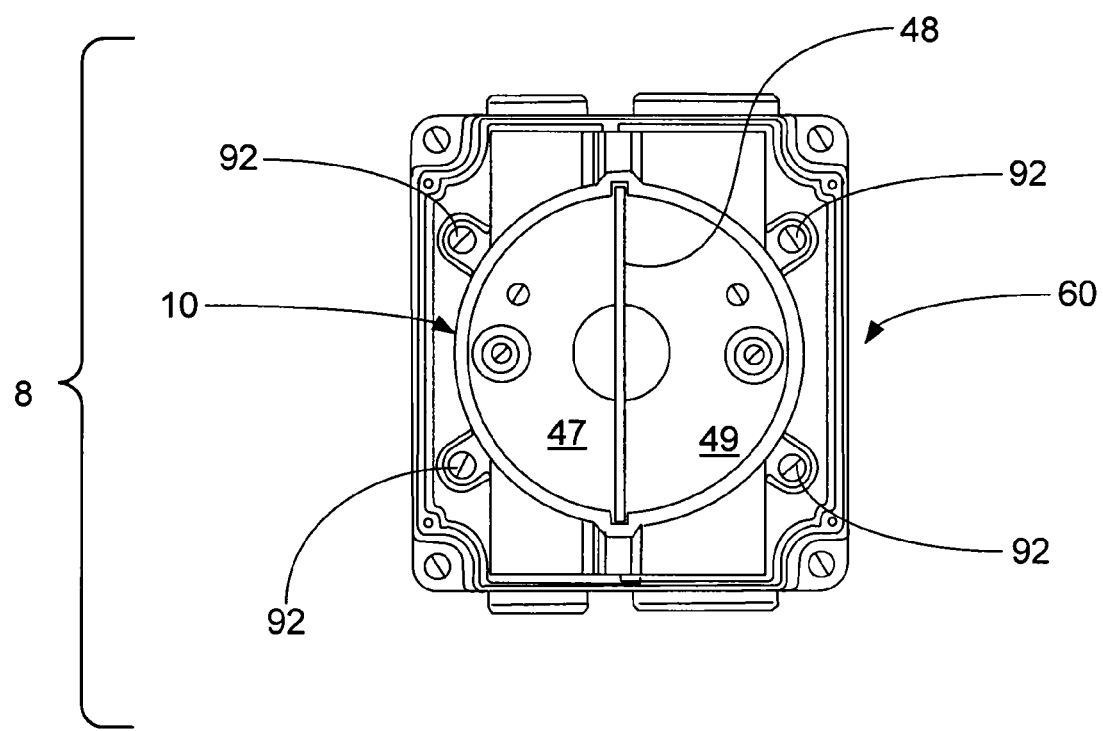
FIG. 7 is a top view of the convertible electrical floor box assembly of FIG. 6 with the non-metallic floor box installed in the metallic floor box.

FIG. 7 shows a top view of the convertible electrical floor box assembly 8 after the non-metallic box 10 is installed in the metallic outer box 60 and secured in place with four screws 92. The voltage divider 48 divides the convertible electrical floor box assembly 8 into a power compartment 47 and a low voltage compartment 49.

Figure 8:
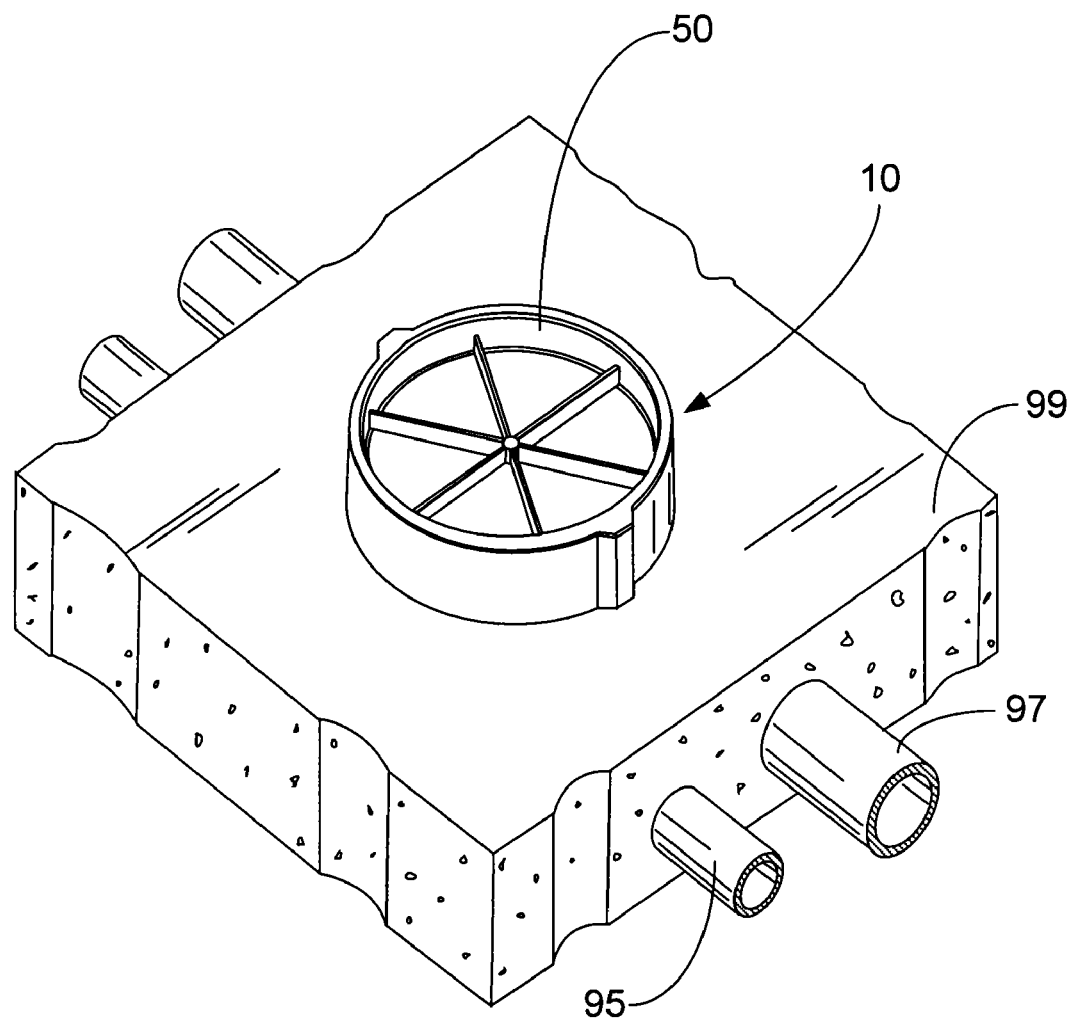
FIG. 8 is a view of the top portion of an embodiment of the convertible electrical floor box assembly installed in a concrete floor.
Figure 9:
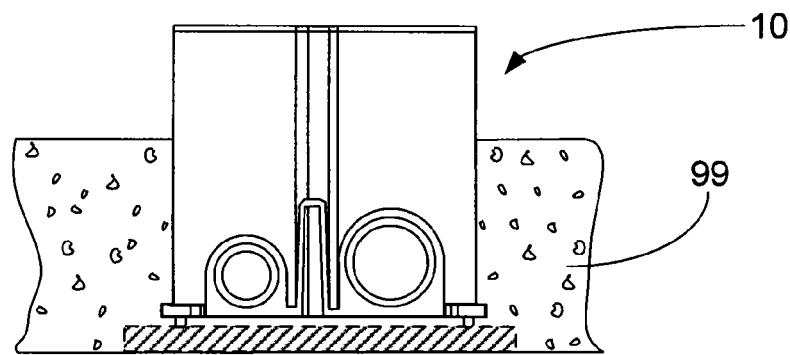
FIG. 9 is a sectional, end view of the non-metallic floor box of the convertible electrical floor box assembly installed in a concrete floor.
Figure 10:
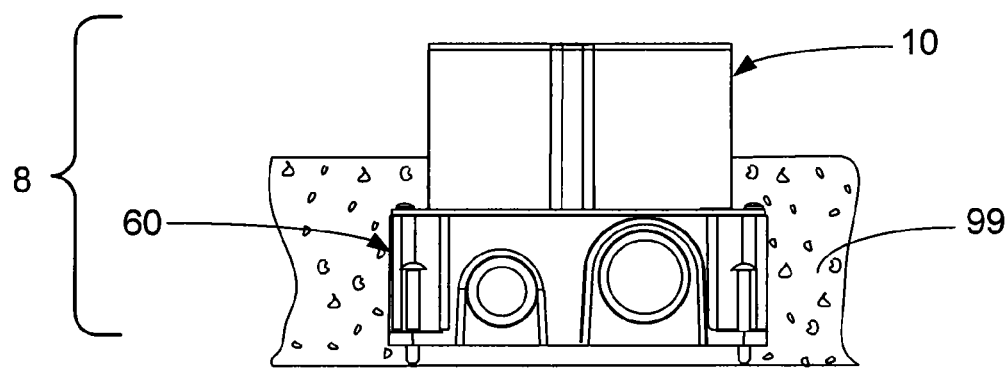
FIG. 10 is a sectional, end view of the metallic floor box of an embodiment of the convertible electrical floor box assembly installed in a concrete floor.

FIG. 8 shows the convertible electrical floor box assembly 8 after a concrete floor 99 has been poured. The metallic outer box 60 is covered by the concrete 99 and only the non-metallic box 10 with a cover 50 is visible. FIG. 8 also illustrates the conduits for low voltage signals and power 95, 97 that are covered by the concrete floor 99. FIG. 9 shows a sectional, end view of an embodiment wherein the non-metallic box 10 is installed in a concrete floor 99 without the metallic outer box 60. FIG. 10 shows a sectional, end view of a convertible electrical floor box assembly 8 that includes non-metallic box 10 and a metallic outer box 60 installed in a concrete floor 99.

Figure 11:
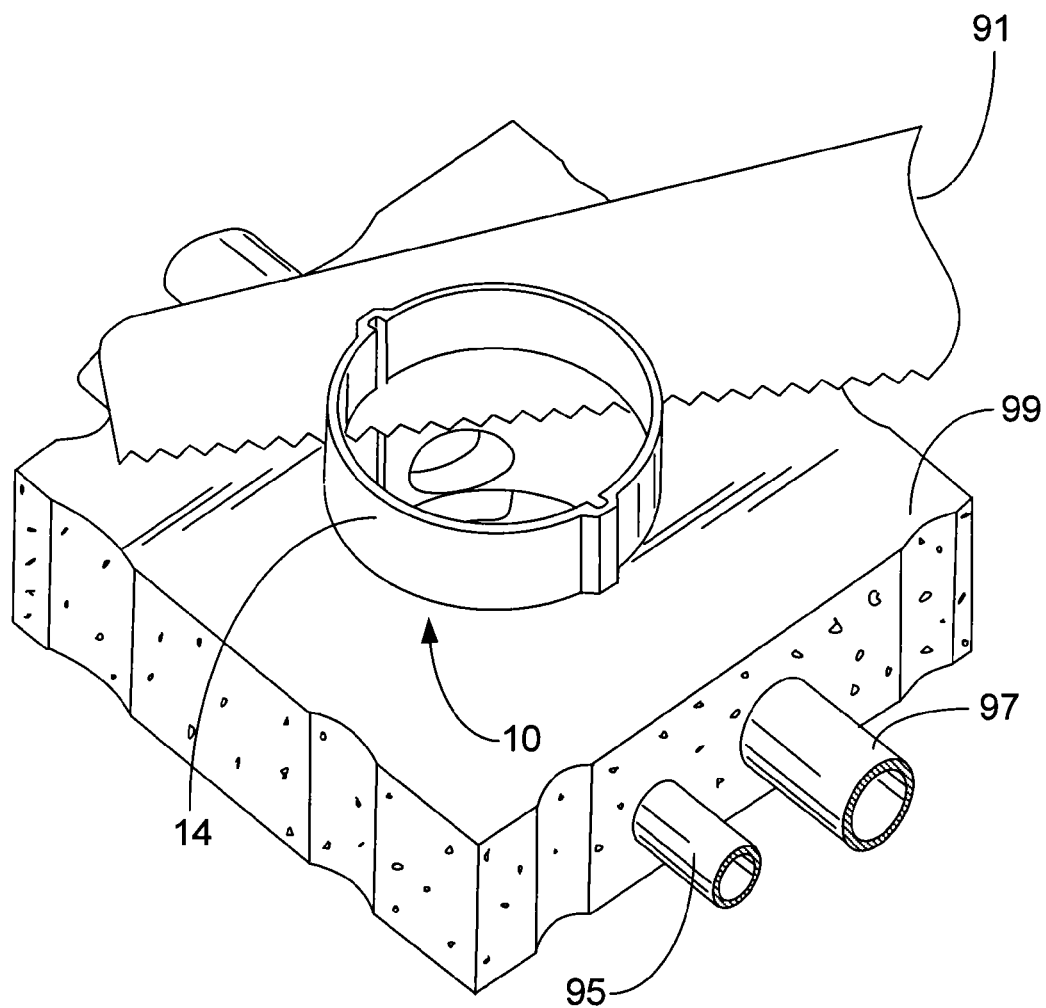
FIG. 11 is a perspective view of the convertible electrical floor box assembly shown in FIG. 8 with the top portion above the concrete floor being sawed off.

FIG. 11 shows the top portion of a non-metallic box 10 extending above a concrete floor 99. The side wall 14 is cut using a saw 91 so that the top of the side wall 14 will be substantially even with the top of the concrete floor 99.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. A convertible electrical floor box assembly comprising:
    a non-metallic floor box comprising a base plate, a perimetrical side wall having an interior side and an exterior side and extending between the base plate and a top edge to define an interior, an open top, one or more openings in the perimetrical side wall for accessing the interior, and at least one mating structure on the exterior side of the perimetrical side wall; and
    a metallic outer box comprising a base plate, a perimetrical side wall having an interior side and extending between the base plate and a top edge to define an interior, an open top, one or more apertures in the perimetrical side wall for accessing the interior and at least one mating structure extending inwardly from the interior side of the perimetrical side wall;
    wherein the non-metallic floor box is adapted for installation in a concrete floor, or wherein the non-metallic floor box and the metallic outer box are used together as an assembly and are adapted for installation in a concrete floor and wherein, when the non-metallic floor box and the metallic outer box are used as an assembly, the non-metallic floor box is received in the interior of the metallic outer box and the mating structure of the non-metallic floor box engages the mating structure of the metallic outer box.

2. The convertible electrical floor box assembly according to claim 1, wherein the non-metallic floor box further comprises an internal support structure in the interior that extends upwardly from the base.

3. The convertible electrical floor box assembly according to claim 2, wherein the internal support structure of the non-metallic floor box comprises a pair of opposing slots formed in the interior side of the perimetrical side wall and adapted to receive a voltage divider.

4. The convertible electrical floor box assembly according to claim 1, wherein the perimetrical side wall of the non-metallic floor box is curved.

5. The convertible electrical floor box assembly according to claim 1, wherein the mating structure of the non-metallic floor box comprises a pair of slotted members formed in opposite sides of the perimetrical side wall.

6. The convertible electrical floor box assembly according to claim 1, wherein the mating structure of the metallic outer box comprises a pair of members located on opposite sides of the perimetrical side wall.

7. The convertible electrical floor box assembly according to claim 1, wherein the mating structure of the non-metallic floor box comprises a pair of members located on opposite sides of the perimetrical side wall, and wherein the mating structure of the metallic outer box comprises a pair of slotted members formed in opposite sides of the perimetrical side wall.

8. The convertible electrical floor box assembly according to claim 1, wherein the non-metallic floor box has a plurality of tabs extending from the exterior side of the perimetrical side wall at the base and each tab has an aperture, wherein the metallic outer box has a plurality of threaded openings in the base plate corresponding to the apertures in the plurality of tabs, and wherein the apertures and threaded openings are adapted to receive mounting screws for securing the non-metallic floor box in the metallic outer box.

9. The convertible electrical floor box assembly according to claim 1, wherein the perimetrical side wall of the non-metallic floor box is substantially round or oval in shape and the perimetrical side wall of the metallic outer box is rectangular, hexagonal or octagonal in shape.

10. The convertible electrical floor box assembly according to claim 9, wherein a removable plate extends between the perimetrical side wall of the non-metallic floor box and the top edge of the metallic outer box.

11. The convertible electrical floor box assembly according to claim 10, wherein the removable plate is secured to the metallic outer box by one or more fasteners or screws.

12. The convertible electrical floor box assembly according to claim 1, wherein the one or more openings in the non-metallic floor box and the one or more apertures in the metallic outer box are correspondingly located to provide access to the interior of the non-metallic floor box.

13. The convertible electrical floor box assembly according to claim 1, wherein the one or more apertures in the perimetrical side wall of the metallic outer box are located adjacent the base plate.

14. The convertible electrical floor box assembly according to claim 1, wherein the one or more apertures in the perimetrical side wall of the metallic outer box are selectively sealed with removable plugs.

15. The convertible electrical floor box assembly according to claim 1, wherein the open top of the non-metallic floor box is adapted to receive a removable cover.

16. The convertible electrical floor box assembly according to claim 1, wherein the perimetrical side wall of the non-metallic floor box has a pair of opposing slots that extend from the top edge to the base plate and have an open end at the top edge of the perimetrical side wall, and wherein the pair of opposing slots are adapted to receive a voltage divider.

17. A convertible electrical floor box assembly comprising:
a non-metallic floor box comprising a base plate, a perimetrical side wall having an interior side and an exterior side and extending between the base plate and a top edge to define an interior, an open top, one or more openings in the perimetrical side wall for accessing the interior, and a pair of opposing mating structures on the exterior side of the perimetrical side wall; and
a metallic outer box comprising a base plate, a perimetrical side wall having an interior side and extending between the base plate and a top edge to define an interior, an open top, one or more apertures in the perimetrical side wall for accessing the interior and a pair of opposing mating structures extending inwardly from the interior side of the perimetrical side wall;
wherein the metallic outer box is adapted to receive the non-metallic floor box and the mating structures of the non-metallic floor box engage the mating structures of the metallic outer box, and wherein the one or more openings in the non-metallic floor box and the one or more apertures in the metallic outer box are correspondingly located to provide access to the interior of the non-metallic floor box.

18. The convertible electrical floor box assembly according to claim 17, wherein the non-metallic floor box further comprises a pair of opposing slots formed in the interior side of the perimetrical side wall and adapted to receive a voltage divider.

19. The convertible electrical floor box assembly according to claim 18, the pair of opposing slots on the interior side is correspondingly located opposite the pair of opposing mating structures on the exterior side of the perimetrical side wall of the non-metallic floor box.

20. The convertible electrical floor box assembly according to claim 19, wherein each of the opposing slots and each of the opposing mating structures are disposed between a pair of openings in the perimetrical side wall.

21. A method of installing a convertible electrical floor box assembly in a concrete floor comprising:
providing a non-metallic floor box and a metallic outer box, wherein the non-metallic floor box comprises a base plate, a perimetrical side wall having an interior side and an exterior side and extending between the base plate and a top edge to define an interior, an open top, one or more openings in the perimetrical side wall for accessing the interior, and a mating structure on the exterior side of the perimetrical side wall, wherein the metallic outer box comprises a base plate, a perimetrical side wall having an interior side and extending between the base plate and a top edge to define an interior, an open top, one or more apertures in the perimetrical side wall for accessing the interior and a mating structure extending inwardly from the interior side of the perimetrical side wall;
positioning the metallic outer box on a substrate for a poured concrete floor;
inserting the non-metallic floor box in the metallic outer box, wherein the mating structure of the non-metallic floor box engages the mating structure of the metallic outer box and the openings in the metallic outer box and the non-metallic floor box are correspondingly located and aligned;
connecting conduit to at least one of the apertures in the metallic outer box;
installing a cover on the top edge of the non-metallic floor box; and
pouring a concrete floor around the convertible electrical floor box assembly.

* * * * *